3,518,217
SPRAYABLE VIBRATION DAMPING MATERIAL
Richard M. Irwin, Philadelphia, and David H. Kollock, Flourtown, Pa., assignors to Philadelphia Resins Company Inc., Philadelphia, Pa., a corporation of Pennsylvania
No Drawing. Filed May 25, 1966, Ser. No. 552,728
Int. Cl. C08g 51/04, 51/24
U.S. Cl. 260—29.2                5 Claims

ABSTRACT OF THE DISCLOSURE

A sprayable vibration damping composition comprising by weight 3%–5% of a liquid epoxy resin, 15%–25% of a polyamide curing agent for the epoxy resin, 70%–85% of sand, 1½% to 4% of water, 2%–3% of asbestos floats, and 3% of a solvent for the polyamide curing agent.

---

This invention relates to a sprayable vibration damping material useful, for example, for coating the interior of a ship's hull or sonar dome where vibration damping is required.

Vibration damping compositions are well known to the art. Such compositions have been applied to structures such as ship's hulls by using preformed tiles or employing an adhesive which provides for a bonded cure at room temperature. While satisfactory vibration damping is achieved, the time and labor involved in the hand lay up procedure results in a high cost. In order to solve this problem, extensive efforts have been made to spray a vibration damping material onto the surface to be coated. These efforts have been unsuccessful heretofore due to the unsuitable nature of the compositions employed for spraying. The viscous nature of the composition necessary to prevent sagging when spraying onto substantially vertical surfaces together with the presence of sand resulted in ready clogging of the spraying apparatus. Further, the sand in the viscous composition heretofore used, rapidly abraded the parts of the spraying equipment, particularly the pump parts, so that it was impractical to keep the spraying equipment operative.

The new spraying composition of this invention has resulted in the elimination of these problems. Spraying can be carried on without clogging and the wearing of the parts of the spraying equipment has been drastically reduced so as to make the maintenance of the spraying equipment a practical proposition. In short, while the heretofore known compositions cannot be sprayed as a practical matter, the composition of this invention can be sprayed with highly satisfactory results and provide for a greatly reduced cost of application.

The spraying composition of this invention contains a self-curing mixture of a liquid epoxy resin and a polymeric polyamide curing agent for the epoxy resin in solution and, preferably, also a polyamine hardener for the epoxy resin. In addition the composition contains sand, asbestos floats and water.

The epoxy resin is a polymeric reaction product of polyhydric phenols with polyfunctional halohydrins and will have terminal epoxy groups and may also have terminal hydroxy groups. Such resins are well known to the art (see Greenlee Patent 2,585,115). Solid epoxy resins may be substituted using suitable solvents such as Cellosolve and ketones such as methyl ethyl ketone to form a solution of the resin.

The polyamide curing agent is a reaction product of polymeric fat acids and an aliphatic polyamine such as ethylene diamine and/or diethylene triamine, triethylene tetramine or tetraethylene pentamine and will contain free amine or carboxyl groups or both free amine and carboxyl groups. The polymeric fat acids employed are, for example, those formed by polymerizing drying or semi-drying oils such as soybean, linseed, cottonseed, corn, tall and similar oils. Polyamide curing agents and their solutions are well known to the art (see, for example, Cowan et al. Pat. 2,450,940, the disclosure of which is incorporated herein). Suitable solvents are, for example, xylene, toluene, aliphatic alcohols, Cellosolve (2-ethoxyethanol) and mixtures thereof. Amino hardeners for epoxy resins are also well known. Exemplary are polyamines such as diethylene triamine (DETA), triethylene tetramine (TETA) and tridimethylaminoethylphenol.

More specifically, the vibration damping composition of this invention has the following composition by weight:

| | Percent |
|---|---|
| Epoxy resin | 3–5 |
| Polyamide | 15–25 |
| Solvent for the polyamide | 3–8 |
| Amino hardener | .75–1.25 |
| Sand | 63.5–75.5 |
| Water | 1.5–4 |
| Asbestos floats | 2–3 |

It will be understood that other ingredients may also be added such as, for example, a flame retardant such as chlorinated wax and antimony trioxide.

The composition of the invention should be made immediately before application. Advantageously the polyamide, the amino hardening agent and the solvent Cellosolve are first mixed together. The epoxy resin is then added and thoroughly mixed. The sand is then added in small increments and thoroughly blended into the mixture. Finally, the water and asbestos floats are added and mixed thoroughly.

By way of still more specific illustration, the following specific composition has been found to be very satisfactory:

EXAMPLE I

| Ingredient | Percent by weight |
|---|---|
| Epoxy resin [1] (Reichold 37–140) | 4 |
| Polyamide curing agent (Reaction product of dimerized soybean oil and diethylene triamine | 20 |
| Tridimethylaminomethylphenol | 1 |
| Cellosolve | 6 |
| Sand | 63.5 |
| Water | 3 |
| Asbestos floats (7TF1) | 2.5 |

[1] Epichlorohydrin-bisphenol of acetone epoxy resin having a viscosity of about 10,000 centipoises (25° C.), an epoxide equivalent of approximately 200, and a melting point of 12° C.

These ingredients were mixed in the manner described above and then sprayed on a ship's hull employing a ram-type pressure feed tank having a 40 to 1 ratio of ram pressure to air supply pressure with the material being sprayed to a thickness of ⅛ of an inch using sixty pounds per square inch of air pressure for atomization.

It will be understood that the above description is by way of illustration and that it is not intended to be limited except as set forth in the following claims.

What is claimed is:

1. A sprayable vibration damping composition comprising by weight:
   3%–5% of a liquid epoxy resin which is a polymeric reaction product of polyhydric phenols with polyfunctional halohydrins having terminal epoxy groups and optionally having terminal hydroxy groups,
   15%–25% of a polyamide curing agent for the epoxy resin, said polyamide curing agent being a reaction product of polymeric fat acids and an aliphatic polyamine containing free amine and/or carboxyl groups,
63.5%–75.5% of sand,
1½% to 4% of water,
2%–3% of asbestos floats, and
3% to 8% of a solvent for the polyamide curing agent.

2. The composition of claim 1 including a .75% to 1.25% of amino hardener for the epoxy resin.

3. A composition in accordance with claim 1 including tridimethylaminoethylphenol and Cellosolve as the solvent for the polyamide.

4. The composition of claim 1 in which the resin is an epichlorohydrin-bisphenol epoxy resin, the curing agent comprises the reaction product of dimerized soybean oil and diethylene triamine and the solvent is 2-ethoxyethanol.

5. The composition of claim 1 in which the resin is an epichlorohydrin-bisphenol epoxy resin, the curing agent comprises tridimethylaminoethylphenol.

References Cited

UNITED STATES PATENTS

| | | |
|---|---|---|
| 3,311,515 | 3/1967 | Weller. |
| 3,059,697 | 10/1962 | Pitts. |
| 3,170,887 | 2/1965 | Ramos. |

OTHER REFERENCES

Renfrew, Chem. & Eng. Chemistry, October, 1954, pp. 2226–2230, vol. 46, No. 10.

MORRIS LIEBMAN, Primary Examiner

S. M. PERSON, Assistant Examiner

U.S. Cl. X.R.

260—33.4, 37